(12) United States Patent
Banno et al.

(10) Patent No.: US 6,634,978 B2
(45) Date of Patent: Oct. 21, 2003

(54) DIFFERENTIAL DEVICE FOR 4WD-VEHICLES

(75) Inventors: Koji Banno, Chiryu (JP); Tohru Kagata, Toyota (JP); Yasuhiro Kobayashi, Toyoake (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/105,400

(22) Filed: Mar. 26, 2002

(65) Prior Publication Data
US 2002/0137589 A1 Sep. 26, 2002

(30) Foreign Application Priority Data

Mar. 26, 2001 (JP) ........................................ 2001-088873

(51) Int. Cl.[7] ........................... F16H 48/06; F16H 48/20
(52) U.S. Cl. ................... 475/222; 180/247; 475/223
(58) Field of Search ..................... 180/247; 475/222, 475/223

(56) References Cited

U.S. PATENT DOCUMENTS

| 4,341,281 A | * | 7/1982 | Nagy | 180/247 |
|---|---|---|---|---|
| 4,545,456 A | * | 10/1985 | Lake | 180/233 |
| 4,625,584 A | * | 12/1986 | Onodera | 180/247 |
| 4,779,698 A | * | 10/1988 | Iwata | 180/247 |
| 4,788,888 A | * | 12/1988 | Tsutsumikoshi | 180/250 |
| 5,105,900 A | * | 4/1992 | Adler et al. | 180/247 |
| 5,105,902 A | * | 4/1992 | Wilson et al. | 180/247 |
| 5,386,898 A | * | 2/1995 | Weilant et al. | 192/67 R |
| 5,997,428 A | | 12/1999 | Kagata et al. | |
| 6,450,915 B1 | * | 9/2002 | Kazaoka et al. | 475/231 |

FOREIGN PATENT DOCUMENTS

JP 8-85355 A 4/1996

* cited by examiner

*Primary Examiner*—Dirk Wright
(74) *Attorney, Agent, or Firm*—Burns, Doane, Swecker & Mathis, LLP

(57) ABSTRACT

A differential device for 4WD vehicles having a reduced size and capable of being produced at lower costs makes it possible to select between a 2WD state, a differential-free 4WD state, and a differential-locked 4WD state. The differential device includes a differential case, a side gear, a hub, and a switching mechanism which establishes and interrupts a connection between each of the differential case, the side gear, and the hub. The switching mechanism includes, among other possible features, a first sleeve, a second sleeve which is separate from the first sleeve, and a pin. A sole actuator moves the second sleeve between first, second and third positions to establish the 2WD state, the differential-free 4WD state, and the differential-locked 4WD state.

20 Claims, 5 Drawing Sheets

DIFFERENTIAL DEVICE FOR 4WD-VEHICLES

The present application is based on and claims priority under 35 U.S.C §119 with respect to Japanese Patent Application No. 2001-088873 filed on Mar. 26, 2001, the entire content of which is incorporated herein by reference.

FIELD OF THE INVENTION

The present invention generally relates to four wheel drive vehicles (4WD-vehicles). More particularly, the present invention pertains to a differential device for 4WD-vehicles which is capable of selecting any one of a two wheel drive (2WD) state, a differential-free 4WD state, and a differential-locked 4WD state.

BACKGROUND OF THE INVENTION

A known differential device for 4WD-vehicles is disclosed in Japanese Patent Laid-Open Publication No. Hei.8-85355. This differential device for 4WD-vehicles is capable of selecting any one of a 2WD state, a differential-free 4WD state, and a differential-locked 4WD state. This differential device includes a differential case to which a driving force is transmitted from a driving shaft to rotate, a differential accommodated in the differential case and having a pair of side gears, with the pair of side gears being adapted to deliver the driving force transmitted to the differential case to a pair of wheel axles, a driving shaft adapted to rotate together with one of the road-wheels, and a first sleeve establishing and interrupting a connection between one of the side gears associated with one of the road-wheels and the driving shaft. The first sleeve is operated upon being shifted in position to switch from the 2WD state to the differential-free 4WD state and vice versa. A second shaft is connected to the outer surface of the first sleeve in a spline connection manner, with the second sleeve establishing and interrupting a connection between the driving shaft and the differential case. The second sleeve is operated upon being position shifted to switch from the differential-free 4WD state to the differential-locked 4WD state and vice versa.

However, the above-described known differential device requires a pair of actuators for shifting the positions of the respective first and second sleeves. The need for these two actuators increases the mass and production costs associated with the differential device.

A need thus exists to provide a differential device which is free from the aforementioned drawbacks.

SUMMARY OF THE INVENTION

A differential device for 4WD vehicles includes a differential case which receives a driving force from a driving shaft to rotate the differential case, first and second side gears accommodated in the differential case to deliver the driving force transmitted to the differential case at a ratio to first and second wheels, a rotation member rotatable together with the first wheel, a sole actuator, a switching mechanism operably driven in a wheel-axis direction by the sole actuator, and a relative movement inhibiting mechanism. The switching mechanism selectively establishes one of a 2WD state in which the rotation member is out of connection with the first side gear, a differential-free 4WD state in which a connection is established only between the rotation member and the first side gear, and a differential-locked 4WD state in which the first side gear is connected to both the differential case and the rotation member. The switching mechanism includes a movable first member continually connected to the rotation member, with the first member being connected to the first side gear when the first member is moved in one direction along the wheel-axis relative to the rotation member, and with the first member being disconnected from the first side gear when the first member is moved in an opposite direction relative to the rotation member. The switching mechanism also includes a movable second member continually connected to the first member, with the second member being connected to the differential case when the second member is moved in one direction along the wheel-axis relative to the first member, and with the second member being disconnected from the differential case when the second member is moved in an opposite direction along the wheel-axis relative to the first member. The second member is positionable in a first position corresponding to the 2WD state, a second position corresponding to the differential-free 4WD state, and a third position corresponding to the differential-locked 4WD state. The relative movement inhibiting mechanism inhibits on demand movement of the first member relative to the rotation member, and inhibits on demand movement of the second member relative to the first member. The relative movement inhibiting mechanism is constructed so that while the second member is positioned within a range from the first position to the second position, the relative movement inhibiting mechanism inhibits the movement of the second member relative to the first member while the first member and the second member are concurrently moved relative to the rotation member. The relative movement inhibiting mechanism is also constructed so that while the second member is positioned within a range from the second position to the third position, the relative movement inhibiting mechanism inhibits the movement of only the first member relative to the rotation member, while the second member is brought into movement relative to the first member under an immovable condition of the first member along the wheel-axis.

The sole actuator drives the second member to move to the first position, resulting in the 2WD state in which the connection is released between the rotation member and one of the side gears. When the second member is moved to the second position, the first member moves together with the second member resulting in the differential-free 4WD state in which the first member connects the rotation member to only one of the side gears. Moreover, when the second member is further moved to the third position, only the second member is moved, with the first member remaining unchanged in position, thus causing both the second and first members to connect the differential case to the rotation member while also causing the first member to connect the rotation member to one of the side gears. This produces the differential-locked 4WD state in which the rotation member, one of the side gears and the differential case are connected. Thus, a differential is provided in which any one of the 2WD state, the differential-free 4WD state, and the differential-locked state can be selected when the second member is moved to respective positions by driving only the sole actuator, resulting in that the differential device can be down-sized and produced at a lower cost.

It might be possible to integrate the first and second members and drive the resulting member to move to the first, second and third positions to establish the aforementioned driving states. However, when such an integrated member is at its second position at which the rotation member and the side gear are connected by the integrated member, the three members receive a driving torque. Thus, to move the three members to the third position would require movement against the friction force asserted between two adjacent members. Thus, a higher output force is required. In contrast, with the differential here, the second member is moved from the second position to the third position and the second position establishes the connection between the rotation member and the side gear via the first member. Thus, only the second member is moved without having to also move the first member whose sliding friction is relatively large. By making the first member and the second member separate from each other, an excessively high output force of the actuator is not necessary.

The rotation member, the first member, the second member, the first side gear and the differential case are preferably in coaxial alignment with each other, and the second member is preferably a substantially cylindrical member in spline connection with the outer surface of the first member which is also preferably a substantially cylindrical member. In addition, the first member is in spline connection with the outer surface of the rotation member, and the first member is connected to the first side gear in a spline connection. Further, the second member is connected to the differential case in a spline connection. This construction helps facilitate a coaxial arrangement of the rotation member, the first member and the second member, resulting in a downsizing of the differential device so that it occupies minimum amount of space.

The relative movement inhibiting mechanism includes an outer groove formed in the outer surface of the rotation member at a side of the first side gear, a radius-reduced portion formed at the inner surface of the second member and extending in the opposite direction of the differential case from a position on the wheel-axis direction, a snap ring fixed to the end portion of the second member which is near the differential case and capable of engaging a side of the first member which faces the first side gear, and a pin slidably fitted in a radially extending through-hole in the first member. The relative movement inhibiting mechanism is operated so that while the second member is positioned within the range from the first position to the second position, the inner end of the pin is brought into contact with the outer surface of the rotation member, the outer end of the pin extends from the outer surface of the first member to engage with a shoulder portion of the radius-reduction portion of the second member, and the snap ring is brought into engagement with the side end of the first member. In addition, while the second member is positioned within the range from the second position to the third position, the outer end of the pin is brought into engagement with the radius-reduction portion of the second member, and the inner end of the pin extends from the inner surface of the first member to engage with the outer groove of the rotation member. Thus, the relative movement inhibiting mechanism which forms, together with the first member and the second member, the switching mechanism, can be constructed more easily and at a lower cost.

When the relative movement inhibiting mechanism is requested to integrally move the first member and the second member in the wheel-axis direction when the second member is within the range between the first position and the second position, the radial inner end of the pin is in engagement with the outer surface of the rotation member. This causes the radial outer end of the pin projecting from the outer surface of the first member to engage the shoulder portion of the radius-reduction portion of the second member, resulting in that when the second member moves toward the differential case the first member moves together with the second member. In addition, the engagement between the snap ring and the end of the first member which is at the side of the side gear causes the second member to move together with the first member when the first member moves away from the differential case. Thus, so long as the second member is anywhere in the range between the first position and the second position, the first member always moves in together with the second member.

On the other hand, if the relative movement inhibiting mechanism is requested to integrate the rotation member and the first member in the wheel-axis direction when the second member is within the range between the second position and the third position, the radial outer end of the pin which is in engagement with the radius-reduction portion of the second member causes the radial inner end of the pin to project from the inner surface of the first member to engage with the outer groove of the rotation member. This causes the pin to integrate the first member with the rotation member in the wheel-axis direction, thus making it possible to establish independent movement of only the second member in the wheel-axis direction which is in spline connection with the first member relative to the first member.

Thus, it is possible to change the member which is to be inhibited to establish relative movement depending on whether the radial outer end of the pin which is slidably fitted in the through-hole in the first member projects from the outer surface of the first member while the second member is between the first and second positions or the radial inner end of the pin projects from the inner surface of the first member while the second member is between the second and third positions.

The above described switching of the pin projecting modes (i.e., whether the pin projects from the outer surface of the first member or projects from the inner surface of the first member) is effected when the second member passes through the second position. In more detail, when the sole actuator begins to move the second member from its first position to its second position, the radial inner end of the pin is in engagement with the outer surface of the rotation member. Thus, even if the pin is applied with a component force in the radially inward direction resulting from the engagement between the radial outer end of the pin and the shoulder portion of the radius-reduction portion of the second member, the pin position remains unchanged and is not moved in the radially inward direction (i.e., the pin still projects from the outer surface of the first member), thus establishing an integrated connection between the first member and the second member.

When the second member approaches its second position, the radial inner end of the pin begins to oppose the outer groove of the rotation member and begins to move into the outer groove by the force resulting from the engagement between the radial outer end of the pin and the shoulder portion of the radius-reduction portion of the second member. At a stage when the second member begins to move beyond the second position toward the third position, the radially inward movement of the pin is terminated in its full engagement with the outer groove of the rotation member. Upon completion of such an insertion of the pin into the outer groove, the radial outer end of the pin is no longer in engagement with the shoulder portion of the second member, but with the inner surface of the radius-reduction portion. The pin thus does not move in the radially outward direction. The engagement of the radial inner end of the pin permits relative movement between the first member and the second member, and inhibits relative movement between the rotation member and the first member. As a result, the second member, independent of the first member, moves from its second position to its third position.

When the second member is moved from its third position to its second position, at first the radial outer end of the pin is in engagement with the inside of the radius-reduction portion of the second member so that the pin does not move in the radially outward direction, thereby allowing only the second member to move. During movement of the second member, the connection between the spline portion of the second member and the spline portion of the differential case is released, which results in establishment of the differential-free 4WD state. When the second member reaches its second position, the snap ring fixed to the second sleeve begins to engage the side of the first member which is next to or faces towards the side gear. Simultaneously, the radial outer end of the pin begins to engage the shoulder portion of the radius-reduction portion of the second member(not the inner surface of the radius-reduction portion). Thus, it is possible for the pin to move in the radially outward direction. At this time, the first member moves together with the second member by the force from the snap ring fixed to the second member. With the combination of this force and the tapered groove structure, the pin is applied with a component force in the radially outward direction, thus causing the pin to slide gradually along the shoulder portion in the radially outward direction. At a stage of moving the second member to the first position passing through the second position, the radially outward movement of the pin is terminated and is placed at a position at which the radial outer end of the pin is capable of being engaged with the shoulder portion of the radius-reduction portion of the of the second member. At this time, the radial inner end of the pin is completely out of engagement with the outer groove of the rotation member and is in engagement with the outer surface of the rotation member, thus not allowing the pin to move in the radially inward direction. The radially outward movement of the pin makes it possible to establish relative movement between the first member and the rotation member, and the first member begins to move together with the second member, which is connected to the first member via the snap ring, from the second position to the first position.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
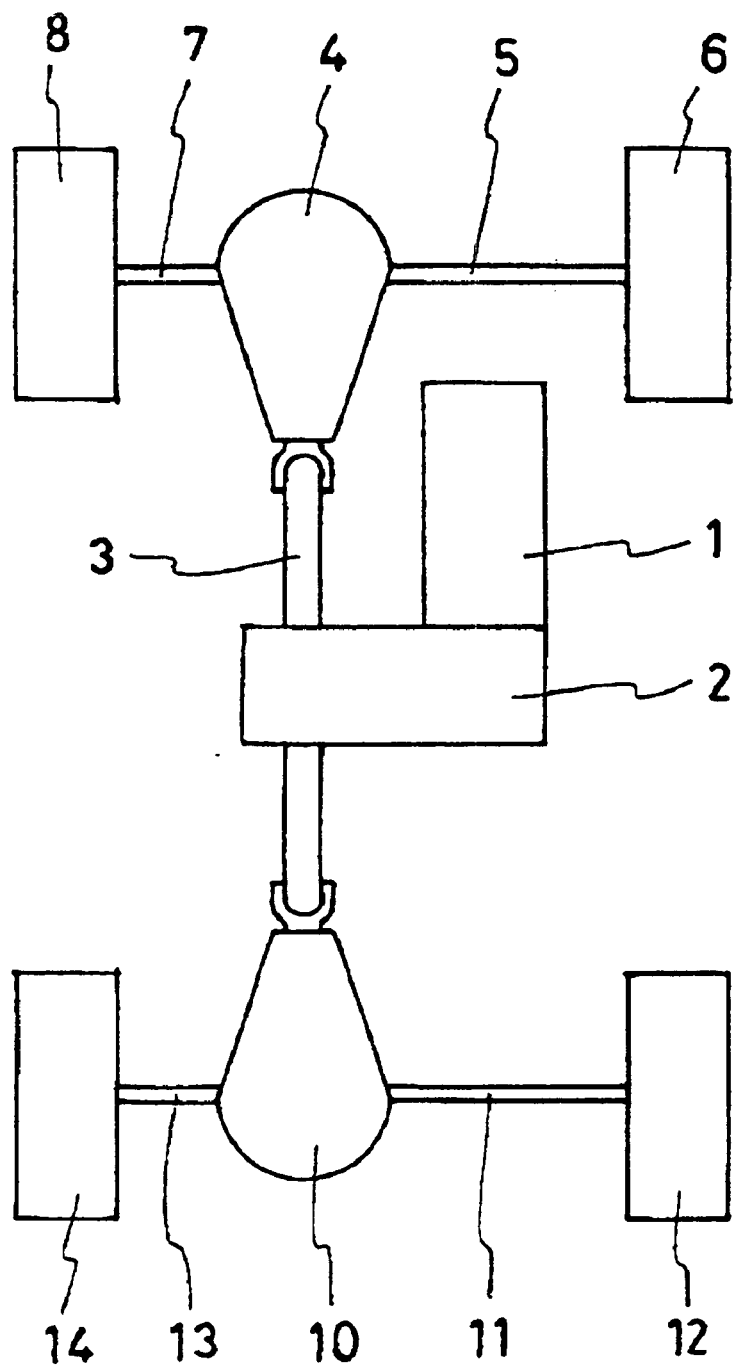
FIG. 1 is a schematic diagram of an automotive vehicle on which is mounted a differential device according to the present invention.

FIG. 1 schematically illustrates the overall structure of an automotive vehicle on which is mounted a differential device 4 in accordance with an embodiment of the present invention. In this automotive vehicle, a transmission 2 is coupled with the output end of an engine 1 serving as a driving source. The transmission 2 is connected at its output side with a driving shaft 3. The driving shaft 3 is coupled at its front-wheel side with the inventive differential device 4 while the driving shaft 3 is coupled at its rear-wheel side with a known-type of differential device 10.

The inventive differential device 4 is connected at its output side with a pair of front wheels 6, 8 by way of respective drive shafts 5, 7, while the differential device 10 is connected at its output side with a pair of rear wheels 12, 14 by way of respective drive shafts 11, 13. The driving force from the driving shaft 3 to the differential device 10 is continually delivered at a distribution ratio to the rear wheels 12, 14. By contrast, the driving force from the driving shaft 3 to the differential device 4 is not transmitted to the front-wheels 6, 8, is transmitted to the front-wheels 6, 8 in the differential-free mode, or is transmitted to the front-wheels 6, 8 in the differential-locked mode depending on, as will be described later, a switching state of a switching mechanism 43 of the differential device 4.

Figure 2:
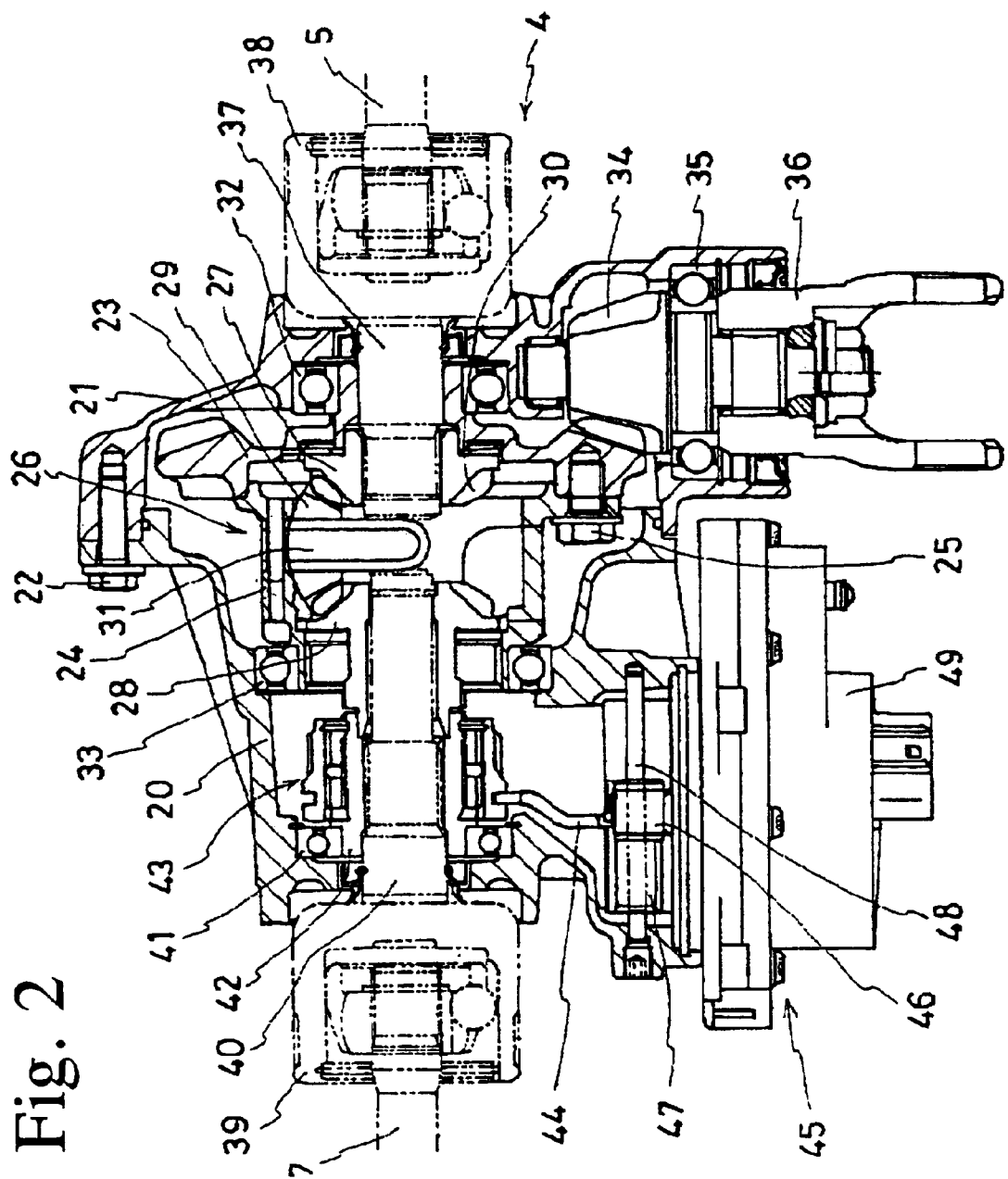
FIG. 2 is a cross-sectional view of a portion of the differential device.

Referring now to FIG. 2, the differential device 4 includes a first housing 20, a second housing 21 fixedly secured to the first housing 20 by way of a plurality of bolts 22, only one of which is shown, and a sole actuator 45 fixedly mounted on the first housing 20 in, for example, a bolted connection manner. A closed space is defined between the first housing 20 and the second housing 21 which are coupled to each other, and a differential gear mechanism 26 is accommodated in the closed space.

The differential gear mechanism 26 is made up of a differential case 24 which is rotatably supported in the first housing 20, a pinion shaft 31 which is secured to the differential case 24 for unitarily rotating with the differential case 24, a pair of pinions 29, 30 which are rotatably supported on the pinion shaft 31, and a pair of side gears 27, 28 which are each in meshing engagement with a respective one of the pinions 29, 30. The differential case 24 is fixedly connected via bolts 25 to a ring gear 23 which is rotatably supported via a bearing 32 in the second housing 21. The differential case 24 is thus rotatable together with the ring gear 23. Additional details regarding the structure and operation of the differential gear mechanism 26 are known to persons skilled in the art and will thus not be described in detail.

The ring gear 23 is in meshing engagement with a pinion gear 34 which is rotatably supported in the second housing 21 via a bearing 35. The pinion gear 34 is coupled to the driving shaft 3 (shown in FIG. 1) by way of a yoke 36. Thus, the rotation torque or driving force produced by the engine 1 and directed to the driving shaft 3 is transmitted to the differential case 24 by way of the yoke 36, the pinion gear 34, and the ring gear 23.

The side gear 27 is coupled to an output shaft 37 by way of a spline connection, and the output shaft 37 is connected to the front right wheel 6 by way of a ball-joint 38 and the drive shaft 5. Thus, a continual connection between the side gear 27 and the front right wheel 6 exists.

The side gear 28 is not in direct or continual connection with an output shaft 40, but is made capable of being in indirect connection with a hub 42 as a rotation member depending on a switching state of the switching mechanism 43 as described in more detail below. The hub 42 is rotatably supported in the first housing 20 via a bearing 41 and is in spline connection with the output shaft 40 which is connected to the front left wheel 8 by way of a ball joint 39 and a drive shaft 7. Thus, the side gear 28 is connected to or not connected to the front left wheel 8 depending on the state of the switching mechanism 43. In addition, even when the side gear 28 which is in meshing engagement with the hub 42 is connected to the front left wheel 8, depending on the state of the switching mechanism 43 as described in more detail below, the hub 42 is connected or not connected to the differential case 24.

While the side gear 28 is out of engagement with the hub 42, the driving force issued from the engine 1 is delivered solely to the side gear 28 which is out of connection with the front left wheel 8. This produces the 2WD state (rear-wheel drive) in which the driving force from the engine 1 is not transmitted to the front wheels 6, 8. In addition, when the side gear 28 is in meshing engagement with the hub 42, if the hub 42 is out of connection with the differential case 24, the differential gear mechanism 26 allows the front-wheels 6, 8 to rotate independently, resulting in the differential-free 4WD state in which the driving force issued from the engine 1 is delivered at a suitable ratio to the front wheels 6, 8. On the other hand, when the side gear 28 is in meshing engagement with the hub 42, if the hub 42 is in connection with the differential case 24, the differential gear mechanism 26 is made invalid, thus allowing the differential case 24 to rotate together with the front left wheel 8, resulting in the differential-locked 4WD state in which the driving force issued from the engine 1 is delivered directly to the front wheels 6, 8. Thus, in the differential device described here, the control or switching of the switching mechanism 43 makes it possible to select any one of the 2WD state, the differential-free 4WD state, and the differential-locked 4WD state.

The switching of the state of the switching mechanism 43 is established by driving a sole actuator 45. The sole actuator 45 is made up of a micro-computer controlled electric motor 49, a reducer for reducing the speed of the output of motor 49, an output gear 46 from which the output of the reducer is derived via a spiral spring, a rack 47 which coverts the rotation of the output gear 46 into movement in a wheel-axle direction (i.e., the horizontal direction in FIG. 2), and a fork 44 fixed to the rack 47. The rack 47 is mounted on a shaft 48 so that the rack 47 is able to slide along the shaft 48.

Figure 3:
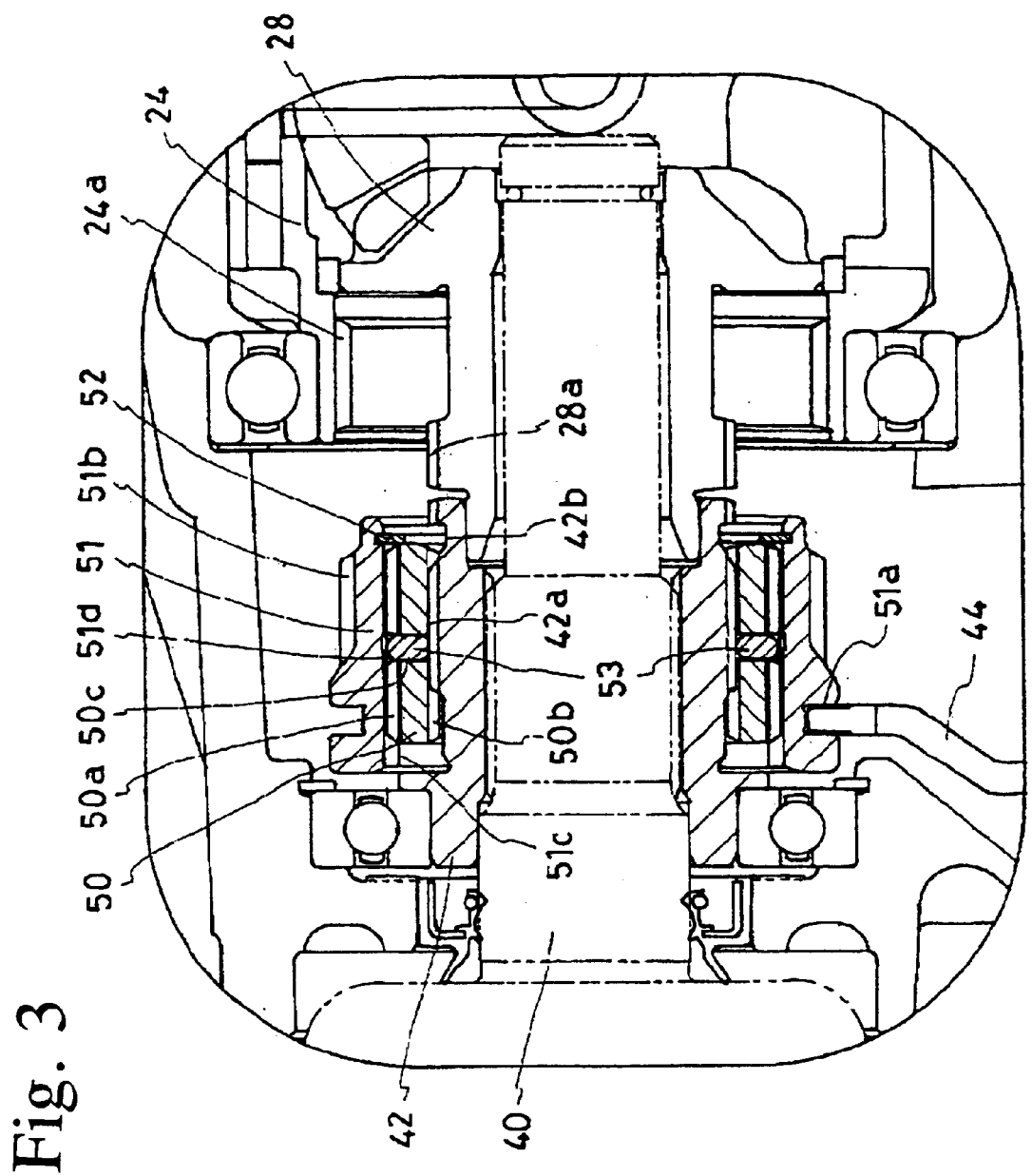
FIG. 3 is an enlarged cross-sectional view of a portion of the differential device shown in FIG. 2 illustrating the switching mechanism when it takes a first position for establishing the 2WD state.

As shown in FIG. 3, the distal end of the fork 44 is in engagement with a groove 51a formed in a second sleeve 51 (i.e., a second member) in the switching mechanism 43. Thus, by controlling the motor 49 to control the position of the second sleeve 51 in the wheel-axis or wheel-axle direction, the differential device 4 can be switched between the various states described above.

Figure 4:
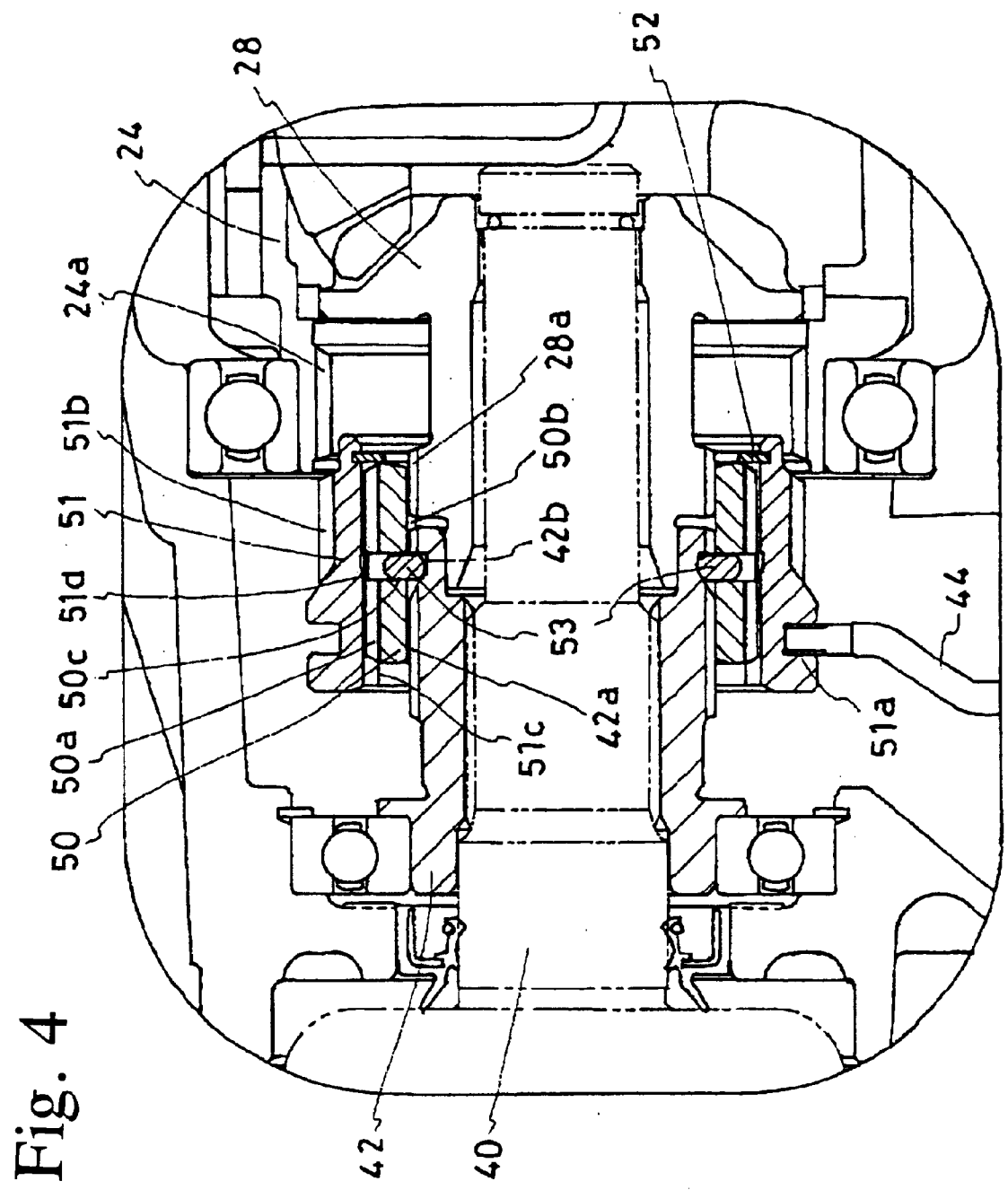
FIG. 4 is an enlarged cross-sectional view of a portion of the differential device shown in FIG. 2 illustrating the switching mechanism when it takes a second position for establishing differential-free 4WD state.
Figure 5:
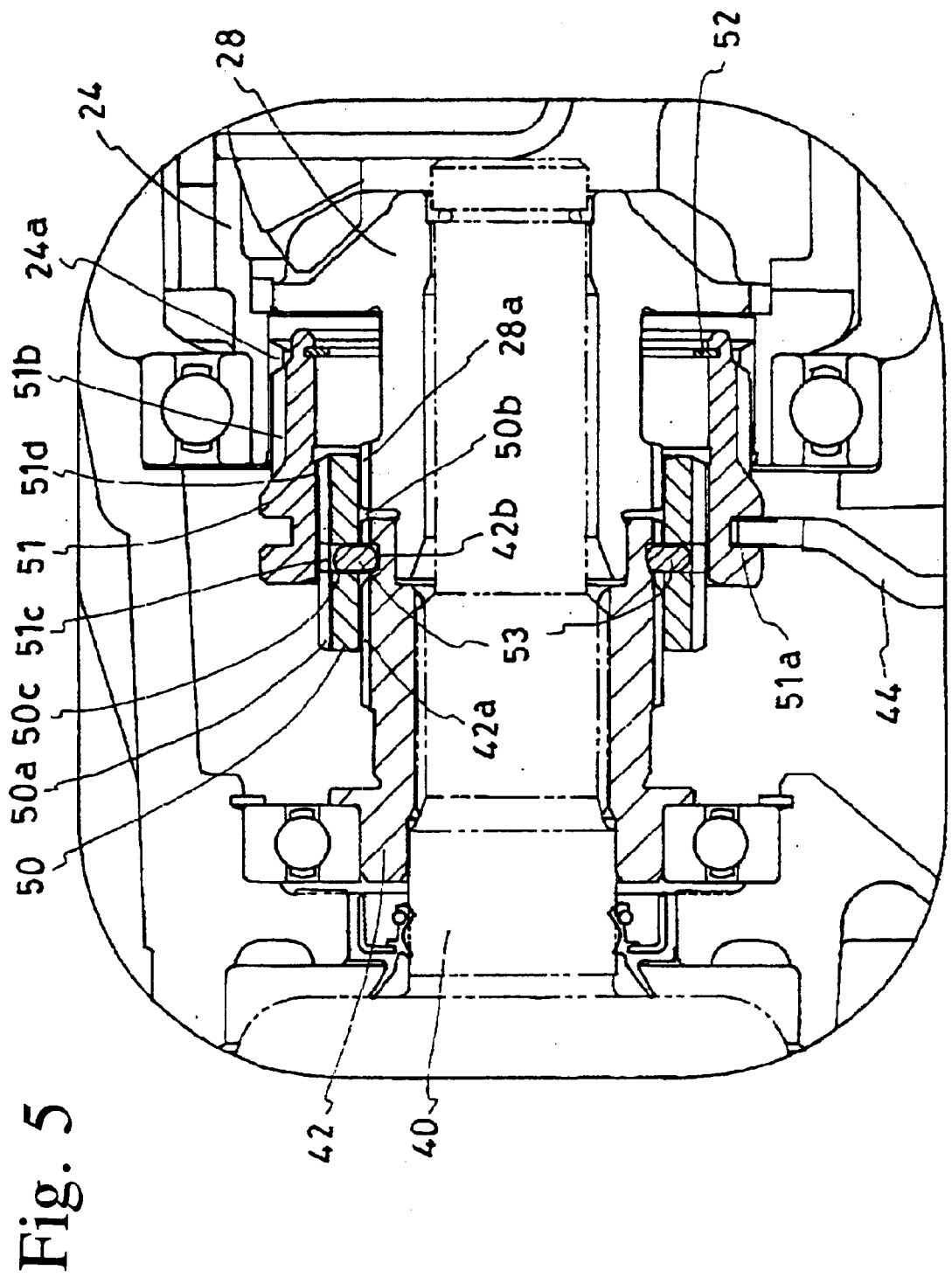
FIG. 5 is an enlarged cross-sectional view of a portion of the differential device shown in FIG. 2 illustrating the switching mechanism when it takes a third position for establishing differential-locked 4WD state.

Referring to FIGS. 3–6, the mechanical structure and operation of the switching mechanism 43 is as follows. FIG. 3 illustrates the switching mechanism in a first position for establishing the 2WD state, FIG. 4 illustrates the switching mechanism in a second position for establishing the differential-free 4WD state, and FIG. 5 illustrates the switching mechanism in a third position for establishing the differential-locked 4WD state.

As shown in FIG. 3, the hub 42 is mounted on the output shaft 40 in a spline connection manner. The rightward region of the outer surface of the hub 42 is provided with a spline portion 42a and an annular groove 42b, with the annular groove 42b being at the side of the side gear 28. The distal end portion of the spline portion 42a constitutes an outer surface of the hub 42.

A first sleeve 50 forming a first member is provided on the hub 42. The first sleeve 50 possesses a substantially cylindrical shape. The first sleeve 50 is formed at its outer and inner surfaces with respective spline portions 50a, 50b which extend in the wheel-axis or wheel-axle direction. A spline connection between the spline portion 50b and the spline portion 42a allows the first sleeve 50 to move in the wheel-axis direction relative to the hub 42.

In addition, a second sleeve 51 forming a second member is provided on the first sleeve 50. The second sleeve 51 possesses a substantially cylindrical shape. The leftward region of the inner surface of the second sleeve 51 is provided with a spline portion 51c as a radius-reduction portion of the second sleeve 51. The right end tapered portion of the spline 51c constitutes a shoulder portion 51d of the radius-reduction portion. The spline portion 51c and the spline connection 50a establish a spline connection between the first sleeve 50 and the second sleeve 51. This allows the second sleeve 51 to move in the wheel-axis direction relative to the first sleeve 50. The rightward region of the outer surface of the second sleeve 51 is formed with a spline portion 51b.

The first sleeve 50 is provided with a pair of radially extending through-holes 50c which are located on a common diameter. A pin 53 is fitted into each of the through-holes 50c in a sliding fashion. The number of pins 53, and associated through-holes, is not limited in this regard.

As illustrated in FIG. 3, the radial inner end of the pin 53 is in abutment with the outer surface of the hub 42 (i.e., the distal end surface of the spline portion 42a). Under such a condition, the radial outer end of the pin 53 extends or projects from the outer surface of the first sleeve 50 and is adapted to engage the shoulder portion 51d of the radius-reduction portion of the second sleeve 51. Thus, in the condition illustrated in FIG. 3, when the actuator 45 causes the second sleeve 51 to move in the rightward direction, although the radial outer end of the pin 53 is applied with a radially inwardly directed force from the shoulder portion 51d of the radius-reduction portion of the second sleeve 51, the engagement of the radial inner end of the pin 53 with the outer surface of the hub 42 prevents the pin 53 from moving in the radially inward direction. Thus, the first sleeve 50 is moved together with the second sleeve 51 so that the two sleeves 50, 52 move rightward. Thus, movement of the second sleeve 51 relative to the first sleeve 50 is prevented.

The second sleeve 51 is fixed at its right end portion in FIG. 3 with a snap ring 52 which is adapted to engage the end of the first sleeve 50 located at the side of the side gear 28. Thus, if the actuator 45 causes the second sleeve 51 to move in the leftward direction in FIG. 3, the snap ring 52 causes the first sleeve 50 to move together with the leftward movement of the second sleeve 51. Thus, the second sleeve 51 does not move relative to the first sleeve 50.

Based on the above description, the switching mechanism 43 is comprised of the first sleeve 50, the second sleeve 51 and a relative movement inhibiting mechanism. In the illustrated and described embodiment, the relative movement inhibiting mechanism can be comprised of the pins 53, the snap ring 52, the spline portion 51c (radius reduction portion), the shoulder portion 51d of the spline portion 51c, the outer surface of the hub 42 (i.e., the distal end portion of the spline portion 42a), and the outer groove 42b.

One end of the side gear 28 as seen with reference to FIG. 3 is provided with an outer spline portion 28a whose cross-section perpendicular to the wheel-axis direction is identical with that of the spline portion 42a of the hub 42. In addition, the end (i.e., left end) of the differential case 24 is provided with an inner spline portion 42a whose cross-section perpendicular to the wheel-axis direction is identical with that of the spline portion 51b of the second sleeve 51. The hub 42, the sleeve 50, the second sleeve 51, the side gear 28, and the differential case 24 are arranged along a common axis. Thus, when the first sleeve 50 is moved in the rightward direction together with the rightward movement of the second sleeve 51, the spline portion 28a of the side gear 28 is capable of engaging with the spline portion 50b of the first sleeve 50 while the spline portion 51b of the second sleeve 51 is capable of engaging with the spline portion 24a of the differential case 24 upon rightward movement of the second sleeve 51. Upon coupling the spline portion 50b of the first sleeve 50 with the spline portion 28a of the side gear 28, the first sleeve 50 connects the hub 42 to the side gear 28, resulting in the differential-free 4WD state. Upon coupling the spline portion 51b of the second sleeve 51 with the spline portion 24a of the differential case 24, both the second sleeve 51 and the first sleeve 50 connect the differential case 24 to the hub 42, resulting in the differential-locked state 4WD state. However, as shown in FIG. 3, when the second sleeve 51 is in its first position, the spline portion 50b of the first sleeve 50 is out of engagement with the spline portion 28a of the side gear 28, resulting in the 2WD state.

Referring to FIG. 4, the positioning and operation of the switching mechanism 43 when the second sleeve 51 is in a second position to establish the differential-free 4WD state is as follows. As shown in FIG. 4, when the switching mechanism takes the second position, the spline 50b of the first sleeve 50 is connected with the spline 28a of the side gear 28. This causes the first sleeve 50 to connect the hub 42 to the side gear 28, resulting in the differential-free 4WD state. During movement of the second sleeve 51 of the switching mechanism 43 from its first position in FIG. 3 to its second position in FIG. 4, the first sleeve 50 moves together with the second sleeve 51 as described above, thus making it possible to switch from the 2WD state to the differential-free 4WD state.

As shown in FIG. 4, when the second sleeve 51 takes its second position, the pin 53 is moved radially inward from its FIG. 3 position to extend from the inner surface of the first sleeve 50 and engage with the outer groove 42b of the hub 42. Thus, the engagement between the radial outer end of the pin 53 and the shoulder portion 51d of the radius-reduction portion of the second sleeve 51 is released. As a result, the second sleeve 51 is capable of moving in the rightward direction relative to the first sleeve 50. In addition, the engagement of the radial inner end of the pin 53 with the outer groove 42b of the hub 42 prevents the first sleeve 50 from moving in the rightward direction in FIG. 4 relative to the hub 42. That is, depending on whether the pin 53 projects outwardly from the outer surface of the first sleeve 50 as shown in FIG. 3 or inwardly from the inner surface of the first sleeve 50 as shown in FIG. 4, relative movement as described above is controlled.

The following is an explanation of the movement of the pin 53 when the pin 53 is moved in the radially inward direction from the position shown in FIG. 3. When the actuator 45 begin to move the second sleeve 51 from its first position to its second position, the radial inner end of the pin 53 is in engagement with the outer surface 42a of the hub 42. Thus, even if the pin 53 is applied with a component force in the radially inward direction resulting from the engagement between the radius outer end of the pin 53 and the shoulder portion 51d of the radius-reduction portion of the second sleeve 51, the pin 53 remains unchanged in its position without being moved in the radially inward direction. That is, the pin 53 still projects from or beyond the outer surface of the first sleeve 50 to establish an integrated connection between the first sleeve 50 and the second sleeve 51.

When the second sleeve 51 approaches its second position, the radial inner end of the pin 53 begins to move into a position opposing or facing the outer groove 42b of the hub 42 and begins to move into the outer groove 42b by the force resulting from the engagement between the radial outer end of the pin 53 and the shoulder portion 51d of the radius-reduction portion of the second sleeve 51. At a point in which the second sleeve 51 begins to move beyond the second position toward a third position, the radially inward movement of the pin 53 is terminated in its full engagement with the outer groove 42b of the hub 42. Upon completion of such movement of the pin 52 into the outer groove 42b, the radial outer end of the pin 53 is in not in engagement with the shoulder portion 5 id of the second sleeve 51, but rather is in contact with the inner surface of the radius-reduction portion of the second sleeve 52. This results in the pin 53 being unable to move in the radially outward direction. The engagement of the radial inner end of the pin 53 in the outer groove 42b of the hub 42 permits relative movement between the first sleeve 50 and the second sleeve 51, and inhibits relative movement between the hub 42 and the first sleeve 50. This results in the second sleeve 51 moving from its second position toward its third position (shown in FIG. 5), independent of the first sleeve 50.

Referring to FIG. 5, the positioning and operation of the switching mechanism 43 when the second sleeve 51 takes its third position during the differential-locked 4WD state is as follows. As shown in FIG. 5, when the switching mechanism 43 is at its third position, the spline portion 50b of the first sleeve 50 is connected to the spline portion 28a of the side gear 28 and the spline portion 51b of the second sleeve 51 is connected to the spline portion 24a of the differential case 24. Thus, the first sleeve 50 connects the hub 42 and the side gear 28, while both the first sleeve 50 and the second sleeve 51 connect the differential case 24 and the hub 42, thus resulting in establishment of the differential-locked 4WD state. While the second sleeve 51 of the switching mechanism 43 moves from the second position shown in FIG. 4 to the third position shown in FIG. 5, as described above, the first sleeve 50 is fixed to or locked by the hub 42, thus allowing only the second sleeve 51 to move. Thus, driving the actuator 45 moves only the second sleeve 51 and causes the second sleeve 51 to move from its second position to its third position. This makes it possible to switch from the differential-free 4WD state to the differential-locked 4WD state.

It is possible to move a member, formed by integrating the first and second sleeves 50, 51, between the first, second, and third positions corresponding to the three driving states. However, if such an integrated member is at its second position at which the hub 42 and the side gear 28 are connected by this integrated member, these three members receive a driving torque. If it is desired to move these three members to the third position, such a movement has to be made against a friction force asserted between two adjacent members. Thus, the actuator 45 has to be designed so that the output force of the actuator 45 is higher.

In the case of the disclosed and illustrated embodiment here, when the second sleeve 51 is moved from the second position to the third position, in which the second position establishes the connection between the hub 42 and the side gear 28 via the first sleeve 50, only the second sleeve 51 is moved without having to also move the first sleeve 50 whose sliding friction is relatively large. Thus, by constructing the first sleeve 50 and the second sleeve 51 to be separate from each other, the actuator does not have to be designed to produce a higher output force.

The description set forth above in connection with the illustrations in the drawing figures explains how the switching mechanism 43 operates while the second sleeve 43 moves from its first position to third position by way of second position. In operation, during movement of the second sleeve 51 from its first position to its second position (from its second position to its third position), the spline portion 50b of the first sleeve 50 begins to connect to the spline portion 28a of the side gear 28 (the spline portion 51b of the second sleeve 51 begins to connect to the spline portion 24a of the differential case 24). However, the connection between the spline portion 50b of the first sleeve 50 and the spline portion 28a of the side gear 28 (the spline portion 51b of the second sleeve 51 and the spline portion 24a of the differential case 24) cannot be established without establishing an in-phase state between the opposing spline portions. Thus, even if the motor 49 of the actuator 45 is turned on to move the second sleeve 51, the sleeve 51 is compelled not to move until the required in-phase condition is realized. In such a case, a spiral spring accommodated in the actuator 45 deforms to compensate for an out-of-coincidence condition between the angular position and the axial position of the second sleeve 51. After establishment of the required in-phase condition, the second sleeve 51 is moved by the restoring force of the spring to complete the expected spline connection.

The reverse movement of the second sleeve 51 of the switching mechanism 43 is as follows. When the second sleeve 51 is moved from its third position (FIG. 5) toward its second position (FIG. 4), at first, the radial outer end of the pin 53 is in engagement with the inside surface of the radius-reduction portion 51c of the second sleeve 51. This ensures that the pin 53 does not move in the radially outward direction, thereby allowing only the second sleeve 51 to move. During movement of the second sleeve 51, the connection between the spline portion 51b of the second sleeve 51 and the spline portion 24a of the differential case 24 is released, thus resulting in establishment of the differential-free 4WD state.

When the second sleeve 51 reaches its second position, the snap ring 52 fixed to the second sleeve 51 begins to engage with the side or end surface of the first sleeve 50 which is located near the side gear 28. Simultaneously, the radial-outer end of the pin 53 begins to engage the shoulder portion 51d of the radius-reduction portion 51c of the second sleeve 51, no longer engaging or contacting the inner surface of the radius-reduction portion 51c. Thus, the pin 53 is able to move in the radially outward direction. At this time, the first sleeve 50 is able to move together with the second sleeve 51 by the force from the snap ring 52 fixed to the second sleeve 51. The combination of this force and the tapered groove structure of the outer groove 42b causes the pin 53 to be applied with a component force in the radially outward direction. This causes the pin 53 to slide gradually along the shoulder portion 51d in the radially outward direction.

At the stage of movement of the second sleeve 51 toward the first position shown in FIG. 3 passing through the second position, the radially outward movement of the pin 53 is terminated, with the pin 53 being placed at a position in which the radial outer end of the pin 53 is capable of being engaged with the shoulder portion 51d of the radius-reduction portion of the second sleeve 51. At this time, the radial inner end of the pin 53 is moved fully out of engagement with the outer groove 42b of the hub 42 and is in engagement with the outer surface (i.e., the distal surface of the spline portion 42a) of the hub 42 so that the pin 53 is unable to move in the radially inward direction. The radially outward movement of the pin 53 makes it possible to establish relative movement between the first sleeve 50 and the hub 42. The first sleeve 50 thus begins to move together with the second sleeve 51, which is connected to the first sleeve 50 via the snap ring 42, from the second position toward the first position. During such movement, the spline connection between the spline portion 28a of the side gear 28 and the spline portion 50b of the second sleeve 50 is released, thus establishing the 2WD state. Thereafter, the first sleeve 50 and the second sleeve 51 reach the first position.

As described above, the present invention makes it possible to provide a 4WD vehicle differential device in which the 2WD state, the differential-free 4WD state, and the differential-locked 4WD state can be selected depending upon the position of the second sleeve 51 as determined by the driving operation of the sole actuator 45.

It is to be noted that a vehicle other than that mentioned above can be outfitted with the differential device described above. For example, it is possible to apply the differential device described herein in a vehicle in which the front wheels are continually transmitted with a driving force from the engine, and the rear wheels are brought into the 4WD state under which the driving force is transmitted from the engine and the 2WD state under which the driving force is not transmitted to the rear wheels. The differential device can be adapted to any vehicle having four or more wheels.

As described above, the invention here makes it possible to provide a differential device for 4WD vehicles which is relatively smaller in size and lower in cost, and capable of selectively establishing any one of the 2WD state, the differential-free 4WD state, and the differential-locked 4WD state.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A differential device for 4WD vehicles comprising:
a differential case which receives a driving force from a driving shaft to rotate the differential case;
first and second side gears accommodated in the differential case to deliver the driving force transmitted to the differential case at a ratio to first and second wheels;
a rotation member rotatable together with the first wheel;
a sole actuator;
a switching mechanism operatively driven along a wheel-axis by the sole actuator to selectively establish one of:
1) a 2WD state in which the rotation member is out of connection with the first side gear; 2) a differential-free 4WD state in which a connection is established only between the rotation member and the first side gear; and 3) a differential-locked 4WD state in which the first side gear is connected to both the differential case and the rotation member;

the switching mechanism comprising:
- a movable first member continually connected to the rotation member, the first member being connected to the first side gear when the first member is moved in one direction along the wheel-axis relative to the rotation member, the first member being disconnected from the first side gear when the first member is moved in an opposite direction relative to the rotation member;
- a movable second member continually connected to the first member, the second member being connected to the differential case when the second member is moved in one direction along the wheel-axis relative to the first member, the second member being disconnected from the differential case when the second member is moved in an opposite direction along the wheel-axis relative to the first member;
- the second member being positionable in a first position corresponding to the 2WD state, a second position corresponding to the differential-free 4WD state, and a third position corresponding to the differential-locked 4WD state;
- a relative movement inhibiting mechanism which on demand inhibits movement of the first member relative to the rotation member, and which on demand inhibits movement of the second member relative to the first member;
- the relative movement inhibiting mechanism being constructed so that:
  - while the second member is positioned within a range from the first position to the second position, the relative movement inhibiting mechanism inhibits the movement of the second member relative to the first member while the first member and the second member are concurrently moved relative to the rotation member;
  - while the second member is positioned within a range from the second position to the third position, the relative movement inhibiting mechanism inhibits the movement of only the first member relative to the rotation member, while the second member is brought into movement relative to the first member under an immovable condition of the first member along the wheel-axis.

2. The differential device as set forth in claim 1, wherein the rotation member, the first member, the second member, the first side gear and the differential case are in coaxial alignment with one another, the second member is a substantially cylindrically shaped member in spline connection with an outer surface of the first member which is a substantially cylindrically shaped member, the first member is in spline connection with an outer surface of the rotation member, the first member being connectable to the first side gear by way of a spline connection, and the second member being connectable to the differential case by way of a spline connection.

3. The differential device as set forth in claim 2, wherein the relative movement inhibiting mechanism comprises:
- an outer groove formed in the outer surface of the rotation member at a position toward a side of the first side gear, a radius-reduced portion formed at an inner surface of the second member and extending in a direction away from the differential case, a snap ring fixed to an end portion of the second member at a position nearer to the differential case than the radius-reduced portion and adapted to engage a side of the first member facing towards the first side gear, and a pin slidably fitted in a radially extending through-hole in the first member;

the relative movement inhibiting mechanism operating such that:
- while the second member is positioned within the range from the first position to the second position, an inner end of the pin contacts the outer surface of the rotation member, an outer end of the pin extends from the outer surface of the first member to engage a shoulder portion of the radius-reduction portion of the second member, and the snap ring engages an end of the first member which faces towards first side gear; and
- while the second member is positioned within the range from the second position to the third position, the outer end of the pin is brought into engagement with the radius-reduction portion of the second member, and the inner end of the pin extends from the inner surface of the first member to engage the outer groove of the rotation member.

4. The differential device as set forth in claim 1, wherein the rotation member, the first member, the second member, the first side gear and the differential case are in coaxial alignment with one another.

5. The differential device as set forth in claim 1, wherein the second member is in spline connection with an outer surface of the first member, and the first member is in spline connection with an outer surface of the rotation member.

6. The differential device as set forth in claim 1, wherein the relative movement inhibiting mechanism comprises an outer groove formed in an outer surface of the rotation member, a radius-reduced portion formed at an inner surface of the second member, and a pin slidably fitted in a radially extending through-hole in the first member.

7. The differential device as set forth in claim 6, wherein the relative movement inhibiting mechanism further comprises a snap ring fixed to an end portion of the second member for engaging a side of the first member facing towards the first side gear.

8. A differential device for 4WD vehicles comprising:
- a differential case which receives a driving force from a driving shaft to rotate the differential case;
- a side gear accommodated in the differential case to deliver the driving force transmitted to the differential case to a wheel;
- a rotation member rotatable together with the wheel;
- a first member connected to the rotation member to rotate together with the rotation member;
- a second member connected to the first member to rotate together with the first member;
- an actuator operatively connected to the second member to axially move the second member between a first position constituting a 2WD state in which the side gear is out of connection with the rotation member and is out of connection with the differential case, a second position constituting a differential-free 4WD state in which the side gear is connected to the rotation member and is out of connection with the differential case, and a third position constituting a differential-locked 4WD state in which the side gear is connected to both the differential case and the rotation member;

a relative movement inhibiting mechanism inhibiting axial movement of the second member relative to the first member while the actuator moves the second member axially between the first position and the second position so that the actuator axially moves the first member along with the second member relative to the rotation member;

the relative movement inhibiting mechanism inhibiting axial movement of the first member relative to the rotation member and permitting relative axial movement between the first and second members while the actuator moves the second member axially between the second position and the third position so that the actuator axially moves the second member relative to the first member.

9. The differential device as set forth in claim 8, wherein the rotation member, the first member, the second member, the side gear and the differential case are in coaxial alignment with one another.

10. The differential device as set forth in claim 8, wherein the second member is in spline connection with an outer surface of the first member, and the first member is in spline connection with an outer surface of the rotation member.

11. The differential device as set forth in claim 8, wherein the relative movement inhibiting mechanism comprises an outer groove formed in an outer surface of the rotation member, a radius-reduced portion formed at an inner surface of the second member, and a pin slidably fitted in a radially extending through-hole in the first member.

12. The differential device as set forth in claim 8, wherein the relative movement inhibiting mechanism comprises a snap ring fixed to an end portion of the second member for engaging an end of the first member facing towards the side gear.

13. The differential device as set forth in claim 8, wherein the relative movement inhibiting mechanism comprises a pin slidably fitted in a through-hole in the first member, the pin having an outer portion engaging a shoulder portion provided on an inner surface of the second member as the second member moves between the first and second positions to prevent relative axial movement between the first and second members, the pin having an inner end positioned in a groove provided on an outer surface of the rotation member as the second member moves between the second and third positions to prevent relative axial movement between the first member and the rotation member.

14. The differential device as set forth in claim 13, wherein the inner surface of the second member includes a radius-reduction portion which engages the outer end of the pin as the second member moves between the second and third positions to maintain the inner end of the pin in the groove in the outer surface of the rotation member.

15. A differential device for 4WD vehicles comprising:

a differential case which receives a driving force from a driving shaft to rotate the differential case;

a side gear accommodated in the differential case to deliver the driving force transmitted to the differential case to a wheel;

a rotation member rotatable together with the wheel;

a first member connected to the rotation member to rotate together with the rotation member;

a second member connected to the first member to rotate together with the first member;

an actuator operatively connected to the second member to axially move the second member between a first position constituting a 2WD state in which the side gear is out of connection with the rotation member and is out of connection with the differential case, a second position constituting a differential-free 4WD state in which the side gear is connected to the rotation member and is out of connection with the differential case, and a third position constituting a differential-locked 4WD state in which the side gear is connected to both the differential case and the rotation member;

a pin slidably positioned in a through hole in the first member and having one portion which engages a portion of the second member during axial movement of the second member between the first position and the second position to interconnect the first and second members and cause the first member to move together with the second member relative to the rotation member and having another portion which engages a portion of the rotation member during axial movement of the second member between the second position and the third position to interconnect the first member and the rotation member and permit the second member to move relative to the first member and the rotation member.

16. The differential device as set forth in claim 15, wherein the rotation member, the first member, the second member, the side gear and the differential case are in coaxial alignment with one another.

17. The differential device as set forth in claim 15, wherein the portion of the second member engaged by a portion of the pin during axial movement of the second member between the first and second positions is a shoulder portion of a radius-reduction portion provided on an inner surface of the second member.

18. The differential device as set forth in claim 15, wherein the portion of the rotation member engaged by a portion of the pin during axial movement of the second member between the second and third positions is a groove provided on an outer surface of the rotation member.

19. The differential device as set forth in claim 15, including a snap ring mounted on an end portion of the second member for engaging an end of the first member facing towards the side gear.

20. The differential device as set forth in claim 15, wherein the second member has an inner surface provided with a radius-reduction portion which engages an outer end of the pin as the second member moves between the second and third positions to maintain an inner end of the pin in engagement with said portion of the rotation member, and the rotation member has an outer surface which engages an inner end of the pin as the second member moves between the first and second positions to maintain an outer end of the pin in engagement with said portion of the second member.

* * * * *